United States Patent [19]
Müller

[11] 3,861,817
[45] Jan. 21, 1975

[54] METHOD AND DEVICE FOR REMOVING MATERIAL FROM WORKPIECES, PARTICULARLY FOR THE APPLICATION OF CORRECTION IN BALANCING

[75] Inventor: Richard Müller, Worfelden, Germany

[73] Assignee: Gebr. Hofmann KG, Darmstadt, Germany

[22] Filed: Oct. 5, 1973

[21] Appl. No.: 403,856

[30] Foreign Application Priority Data
Dec. 4, 1972 Germany............................ 2259268

[52] U.S. Cl............................. 408/1, 408/2, 408/16
[51] Int. Cl........................ B23b 49/00, B23b 35/00
[58] Field of Search................ 408/2, 16, 1; 90/11 E

[56] References Cited
UNITED STATES PATENTS
3,302,491   2/1967   Bjorn et al............................. 408/2
3,446,100   5/1969   Munk..................................... 408/16

*Primary Examiner*—Gil Weidenfeld
*Attorney, Agent, or Firm*—Cushman, Darby and Cushman

[57] ABSTRACT

Apparatus and method for eliminating material from workpieces to correct imbalance by drilling or milling whereby the depth of advance of the cutter is detected and a first signal is produced which varies as a function of depth, and more particularly, proportionate to material removed until perforation. Perforation is sensed and a further signal, representing the first signal delayed in time, produced and subtracted from the first signal.

6 Claims, 2 Drawing Figures

METHOD AND DEVICE FOR REMOVING MATERIAL FROM WORKPIECES, PARTICULARLY FOR THE APPLICATION OF CORRECTION IN BALANCING

The invention relates to a method and device for removing mass from workpieces, particularly by drilling or milling, whereby the drill or mill advance is sensed and an electric voltage signal proportionate to the drill depth and/or the mass removed is generated.

When balancing workpieces and more particularly parts of serial manufacture, the mass correction is often effected by boring out or milling off material from the surface or front side of the body to be balanced, such as a rotor. For this purpose, the drill advance is sensed by a path/voltage transducer starting at the moment when the drill point comes into contact with the rotor, and generating a voltage proportionate to the respective drill depth. This voltage proportionate to the drill depth is for instance distorted in such a way by means of an accordingly dimensioned diode network that at the output of the network a voltage will be produced proportionate to the mass removed, taking into account the drill point.

In production balancing machines, the voltage proportionate to the quantity is often subtracted from a voltage which is proportionate to the amount of imbalance which has been detected and stored in a preceding measuring run, and the difference is displayed on a measuring instrument. This measuring instrument should show zero when the correct drill depth is reached; at this moment, the drill advance can be interrupted either automatically or manually. If the voltage proportionate to depth shall be distorted to a voltage proportionate to quantity, networks are used which consist of a number of diodes, the bias voltage of which is so variable that their curves may be modified to suit different drill lip angles or bore diameters.

Regarding an ideal twist drill, the curve representing its function across the length of the drilling taper should correspond to a cubic function and at the moment when the drilling taper has been immersed completely in the workpiece, the curve should ascend linearly.

The problem often arises concerning rotors of comparatively thin wall thickness requiring correction by drilling or milling. In order to be able to remove as much material as possible, a comparatively large drill diameter is chosen, causing, because of the thin wall of the workpiece, perforations. This requires a functional curve which corresponds to that described before to prevent the drill or milling cutter from projecting from the back of the rotor.

When the material is being perforated, however, the increase in quantity will be diminished by the amount the drill point projects from the material until eventually the quantity bored off will not increase any longer although the material has been completely perforated and the drill depth is still increasing. In workpieces of serial manufacture, with an invariable thickness of material, a functional curve can be calculated without difficulty and realized by a respective network of diodes so that at the output of this network, a voltage proportionate to the respective quantity can be produced to control the correction for imbalance. If the thickness of material is not constant, as for instance, in castings or deep-drawn sheet metal parts, the device described above cannot be used since a functional curve changing with the thickness of material must be applied.

There are further devices in which correction for imbalance of rotors with thin walls is effected by means of drilling with a tapered drill or a so-called step drill, whereby the drill depth will eventually correspond to the bore diameter. The quantity of material drilled off depends however, entirely on whether or not the thickness of material is uniform.

The object of the invention is a method and device which establishes a proportional relation between the amount or quantity of material drilled off and the voltage signal resulting therefrom.

In the afore-mentioned device, this task is solved according to the invention in that perforation of the workpiece is sensed by means of a further sensor, and, subsequently, another voltage similar to the first one is available proportionate to the advance or to the material to be removed from the moment of perforation on, and in that one of the two voltages is subtracted from the other so that a voltage will be obtained which is proportionate to the mass in fact removed.

This procedure can be carried out in such a way that, for generating the two voltages, one voltage each proportionate to a path corresponding to the drill or cutter advance is produced and subsequently transformed into a voltage proportionate to the quantity removed.

A device for carrying out this procedure comprises a drilling and/or milling cutter tool to remove mass from workpieces, a sensor supplying a voltage proportionate to the path of the drill or cutter advance, and an electric circuit transforming the voltage proportionate to path into a voltage proportionate to mass quantity, corresponding to the configuration of the tool.

For solving the above mentioned problem, this device according to the invention suggests uses of the sensor of the cutting point of the tool as switching means which makes it possible that the voltage proportionate to path of the drill and/or milling cutter advance is led to a circuit for producing a voltage proportionate to quantity corresponding to the configuration of the tool, and that a subtracting circuit is integrated after the two circuits for producing the voltage proportionate to quantity. In order to provide for a prompt response of the switching means when the drill and/or cutter passes through the workpiece, the switching means may be adapted as a commutator operable by pressure. After its actuation, the switching means may be pivotally adapted, in order to avoid damage by the drill and/or cutter having passed through the workpiece.

Two circuits may further be included to change the voltage proportionate to path into the voltage proportionate to quantity, one circuit being related to the advancing motion of the drill and/or cutter before perforation and the other one being related to the advancing motion after perforation.

The circuit for generating the voltage proportionate to quantity related to the advancing motion after perforation, can at its output be kept to zero by means of a differential amplifier integrated before, until the workpiece is perforated by the drill and/or cutter, that is to say until the drill and/or cutter reaches the switching means.

With use of the invention, it is easily possible to generate a voltage corresponding to the mass actually removed independent of the thickness of material. Moreover, workpieces of different thickness of material can also be balanced without any difficulty.

The device is now being more fully described with reference to the FIGURES and based on one embodiment of the invention in which.

Figure 1:
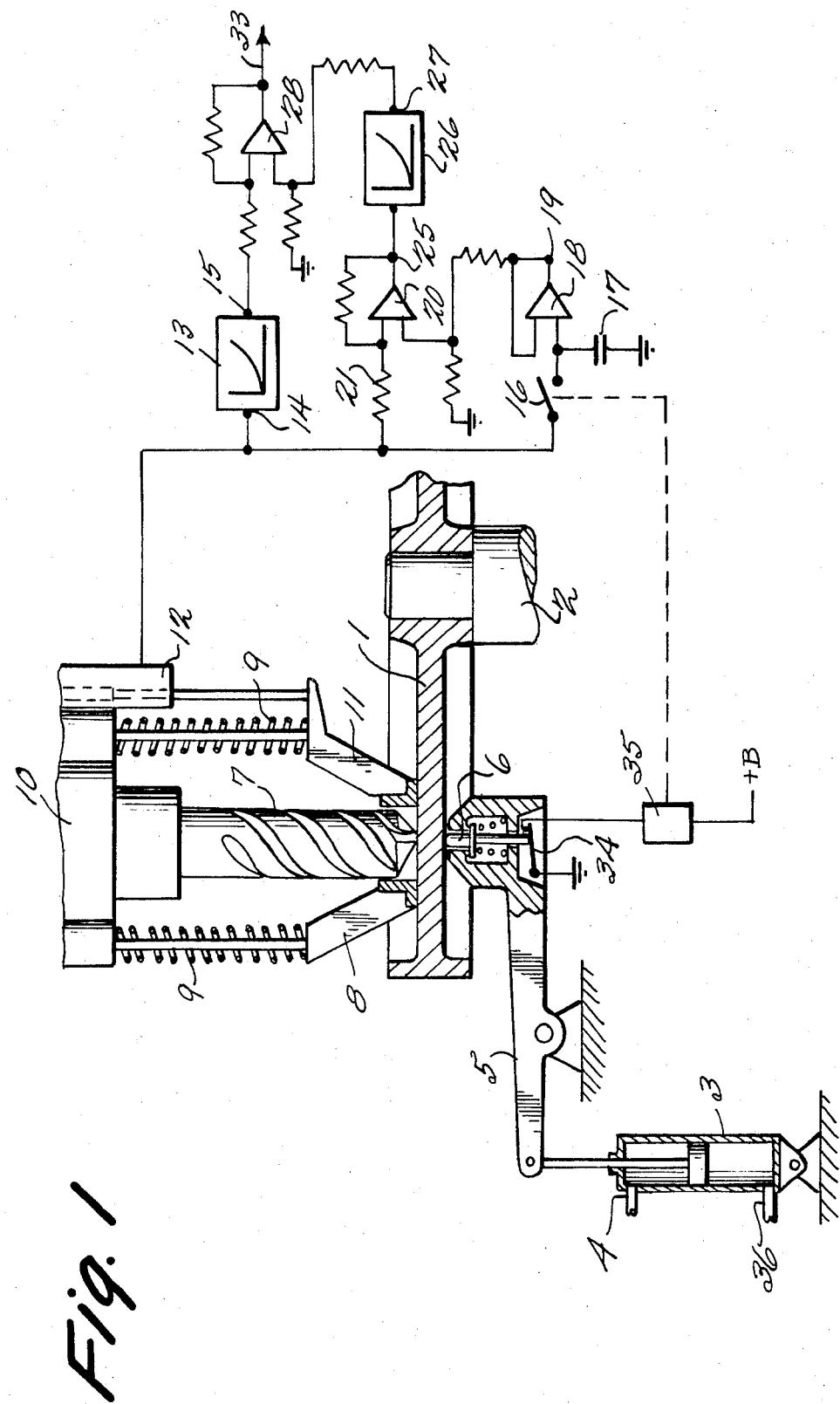
FIG. 1 illustrates one embodiment of a device for carrying out the invention.

FIG. 1 shows a sectional view of a disk-shaped rotor 1 which is to be balanced. Rotor 1 is mounted on a balancing spindle 2. During correction, spindle 2 is stopped and locked in the correct angular position for balancing. At the inlet 4 of a compressed-air cylinder 3, compressed air is admitted in order that a sensing lever 5 may abut against the underside of the workpiece. In this sensing lever 5, a sensing pin 6 is resiliently incorporated also abutting against the underside of the workpiece. A drill 7 is centered in a drill guide 8 which is pressed against the rotor surface by means of springs 9. Between boring quill 10 and a bridge 11 connected with the drill-guide 8, a path/voltage transducer 12 senses the drill depth applied to rotor 1.

The output voltage of the path/voltage transducer 12 is proportionate to the absolute drill depth. It is fed into an input terminal 14 of a circuit 13, at the output terminal 15 of which a voltage is available proportionate to the mass quantity which would be removed from a sufficiently thick-walled material by drill 7 assuming no perforation. A diode or other network can be used for this purpose. The voltage signal proportionate to depth will further pass through a closed relay contact 16 which is normally open to charge a capacitor 17 and through an amplifier 18, connected as an impedance transducer, to an output terminal 19 where a voltage also proportionate to the drill depth is generated. The voltage proportionate to depth of the path-voltage transducer 12 is further coupled through a resistor 21 into a differential amplifier 20 subtracting therefrom the voltage also proportionate to depth on contact 19 so that the voltage on an output contact 25 of the differential amplifier 20 will be zero.

When the drill point perforates workpiece 1, the sensing pin 6 will be slightly pressed and a relay contact 34 is opened. As a consequence, a relay 35 will be deactivated and the relay contact 16 opens. From now on, the voltage on capacitor 17 and on contact 19, therefore, too, will be constant, capacitor 17 in effect memorizing the applied voltage at perforation.

In further penetrating the workpiece 1, however, the voltage supplied by path/voltage transducer 12 will increase so that a voltage will be available on output contact 25 of the differential amplifier 20. This voltage is proportionate to the depth of penetration of the drill point at the back of workpiece 1. The output of amplifier 20 is coupled into a further circuit 26 the function of which is identical with that of circuit 13. The output voltage of circuit 26 at terminal 27 is now subtracted from the voltage at terminal 15, so that a voltage is generated at output 33 proportionate to the quantity actually bored off. Furthermore, the opening of switch 34 causes the air supply 4 from the compressed-air cylinder 3 to be cut off and fed through an input 36 of the cylinder. This causes the sensing lever 5 together with sensing pin 6 and switch 34 to swivel away from the underside of the workpiece in order that damage by the drill perforating the material is avoided.

Figure 2:
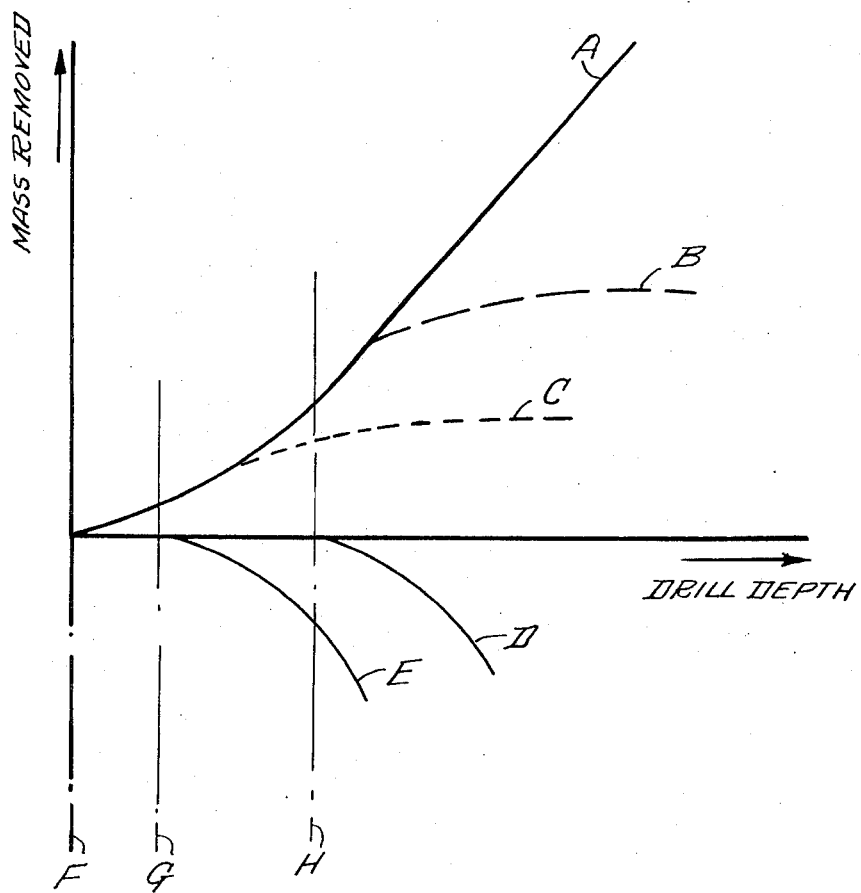
FIG. 2 illustrates a graphic representation showing the material removed depending on drill depth.

With reference to FIG. 2, the mode of action of the device is now more fully described. In this figure, the ordinate shows the quantity of material drilled off, and the abscissa represents the drill depth. Curve A represents the quantity of that part of the drill having perforated the surface of the workpiece. The curve B illustrates the quantity bored off from a thick workpiece. The curve C plots the bored off quantity in the case of a thin workpiece. Curve D shows the quantity subtracted from the quantity illustrated by curve A with respect to a thick rotor while curve E shows that with respect to a thin rotor. The dash-and-dot line F indicates the top edge or the upper surface of the workpiece, the dash-and-dot line G shows the underside of a thin workpiece, the dash-and-dot line H the underside of thick workpiece.

Curve A first takes a roughly cubic course corresponding to the shape of the drilling taper and then changes into an ascending leg as soon as the drilling taper has completely perforated the surface of the workpiece. When the drill point reaches and perforates the underside of the workpiece, relay contact 16 will be opened by means of depressing the sensing pin 6 (FIG. 1) so that a voltage as a function of the drill depth will be generated at output 25 of the differential amplifier, the voltage being transformed in circuit 26 into a voltage proportionate to quantity as represented graphically by curves D and E with respect to a thick and a thin workpiece. This voltage is subtracted from voltage A of differential amplifier 28, at the output 33 of which a voltage variation will be available which is proportionate to the course of curve B or C. Thus, a proportional relationship is established of the voltage and the quantity actually drilled off. As can be gathered from FIG. 2, the two curves B and C are horizontal as soon as the whole drilling taper will have penetrated the underside of the workpiece.

Many changes and modifications in the above-described embodiments of the invention can of course be carried out without departing from the scope thereof. Accordingly, the scope is intended to be limited only by the scope of the appended claims.

I claim:

1. A method for the elimination of material from workpieces to correct imbalance by cutting off material comprising advancing a rotating cutter into a workpiece,
   sensing the depth of advance of the cutter and generating a first electrical signal proportionate to the advance,
   producing a second electrical signal proportionate to the material removed from said signal proportionate to the advance,
   sensing the perforation of the workpiece and subsequently generating a third signal proportionate to the advance from the moment of perforation on, and
   subtracting the third signal from said first signal to cause said second signal to be proportional to the material actually drilled off after penetration through the workpiece.

2. Apparatus for eliminating material from workpieces to correct imbalance by cutting off material comprising:
   means for sensing the depth of advance of cutter and producing a first electrical signal which varies as a function of that depth, means for sensing the perforation of the workpiece and producing a second electrical signal which varies as a function of the advance of said cutter beyond perforation, and means for receiving said first and second signals and producing a further electrical signal as a result of said first and second signals which varies as a function of and is porportional to the material eliminated.

3. Apparatus as in claim 2 wherein said sensing and second signal producing means includes means for producing, upon detection of perforation, a signal identical to said first signal but delayed in time by an interval equal to the time interval between initiation of cutting and detection of perforation and wherein said further signal producing means includes means for subtracting said second signal from said first signal.

4. Apparatus as in claim 2 wherein said sensing and second signal producing means includes means for producing a cutter advance signal which varies as a function of cutter advance, means for storing said signal, switch means connecting said storing means to said signal producing means for shifting to an open condition upon detection of perforation so that the stored valve thereafter does not change until said switch means shifts back to its closed condition, means for subtracting said stored valve from said cutter advance signal to produce a perforation signal and means including means for subtracting said perforation signal from said first signal.

5. Apparatus as in claim 4 wherein said sensing and second signal producing means includes switching means actuated by pressure.

6. Device as claimed in claim 5 wherein said switching means is pivotally actuated.

* * * * *